United States Patent Office 3,557,119
Patented Jan. 19, 1971

3,557,119
2,3,7,8,9,9a-HEXAHYDRO-1H-BENZO[d,e][1,7]
NAPHTHYRIDINE DERIVATIVES
Leslie G. Humber, Dollard des Ormeaux, Quebec, Canada, assignor to American Home Products Corporation, New York, N.Y., a corporation of Delaware
No Drawing. Filed Apr. 11, 1967, Ser. No. 629,935
Int. Cl. C07d 39/10
U.S. Cl. 260—287
22 Claims

ABSTRACT OF THE DISCLOSURE

There are disclosed herein the compounds 4,5-dimethoxy- and 5,6 - dimethoxy-2,3,7,8,9a-hexahydro-1H-benzo[d,e][1,7]naphthyridines, and their 2-methyl, 7-methyl, and 2,7-dimethyl derivatives, optionally substituted in positions 1 and 8 by acyl, haloacyl, aminoacyl, lower alkyl, aminoalkyl, and carboxymethyl groups. A process for preparing the above compounds via the intermediate 1-phthalamidomethyl derivatives of the appropriately substituted tetrahydroisoquinolines and the corresponding 1-aminomethyl derivatives, by cyclizing the latter compounds with formaldehyde or acetaldehyde and a mineral acid, is disclosed.

The compounds are antibacterial agents, and methods for their use are also disclosed.

---

This invention relates to certain novel benzonaphthyridine derivatives, to processes for their preparation, to intermediates used in the course of their syntheses, and to pharmaceutical compositions containing the said compounds.

More particularly, the compounds of this invention are characterized by the presence of the novel tricyclic peri-fused benzonaphthyridine ring system shown in Formula I. The compounds are thus named as benzo[d,e][1,7]naphthyridines, and the scope of this disclosure is as described in the Formula I,

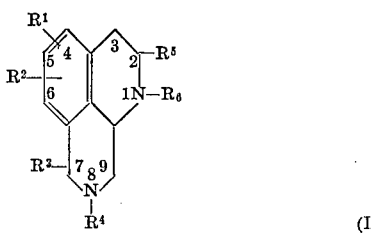

(I)

in which $R^1$, $R^2$, $R^3$, $R^4$, $R^5$ and $R^6$ may all represent hydrogen; or $R^1$ and $R^2$ may represent modified oxygen functions on an aromatic ring such as, for example, hydroxyl, lower acyloxy, and lower alkoxy groups containing from one to four carbon atoms, and the methylenedioxy group; $R^3$ represents a lower alkyl group of from one to four carbon atoms, the phenyl group or a phenyl (lower alkyl) group containing from seven to ten carbon atoms; $R^5$ represents a lower alkyl group containing from one to four carbon atoms; and $R^4$ and $R^6$ may represent acyl groups such as formyl, acetyl, or the phenylacetyl group optionally substituted in the phenyl ring, methanesulfonyl, toluenesulfonyl and benzenesulfonyl groups, and aminoacyl or haloacyl groups; alternatively, $R^4$ and $R^6$ may represent lower-alkyl, amino-substituted alkyl containing from four to nine carbon atoms, or phenylalkyl groups with six to eight carbon atoms, optionally substituted in the phenyl ring or lower alkoxycarbonylmethyl or carboxymethyl groups.

The compounds of this invention are basic in nature and their salts with pharmacologically acceptable acids are also meant to be within the scope of this invention.

The compounds of this invention of Formula I possess useful pharmacological properties as antibacterial agents, being active against Staphylococcus pyogenes (both penicillin-sensitive and penicillin-resistant strains), Sarcina lutea, Streptococcus fecalis, and Salmonella pullorum.

As antibacterial agents for topical use, the compounds of Formula I may be formulated as solutions, creams, or lotions with pharmacologically acceptable vehicles containing from 0.1 to 1.0 percent of the active ingredient. Such formulations may be applied topically to the site of infection as required.

The novel compounds of this invention are prepared as described in the following formulae. Thus, β-phenethylamine of a polysubstituted β-phenethylamino of Formula II wherein $R^1$, $R^2$, and $R^5$ are as defined above, is condensed with phthalylglycylchloride (III), in the presence of an acid scavenging agent such as, for example, pyridine or an alkali metal carbonate, bicarbonate, or hydroxide, and in the presence of solvents in which the reactants are soluble, such as, for example, water, benzene, or diethyl ether, to obtain the corresponding N-phthalimidoacetyl derivative (IV), in which $R^1$, $R^2$ and $R^5$ are as defined above. For example, when $R^1$ and $R^2$ are methoxyl groups situated in the 3 and 4 positions, and $R^5$ is hydrogen, the product obtained is N-phthalimidoacetylhomoveratrylamine (IV, $R^1=R^2=OCH_3$, $R^5=H$). The intermediate (IV) is subsequently subjected to the action of a suitable dehydrating agent, such as, for example, phosphorus oxychloride, polyphosphoric acid, or phosphorus pentoxide, and at a temperature between 60° C. and 170° C., and, optionally, in the presence of an inert solvent such as, for example, benzene, toluene, xylene, or chloroform, to obtain the corresponding 1-phthalimidomethyl-3,4-dihydroisoquinoline (V), in which $R^1$, $R^2$ and $R^5$ are as defined above. For example, when using N-phthalimidoacetylhomoveratrylamine described in the above reaction, 1-phthalimidomethyl-3,4 - dihydro - 6,7 - dimethoxyisoquinoline is obtained (V, $R^1=R^2=OCH_3$, $R^5=H$).

The dihydroisoquinoline derivative of Formula V is converted to the corresponding tetrahydroisoquinoline derivative (VI) in which $R^1$, $R^2$ and $R^5$ are as defined above. In the specific case mentioned above, 1-phthalimidomethyl-6,7-dimethoxy - 1,2,3,4 - tetrahydroisoquinoline is obtained (VI, $R^1=R^2=OCH_3$, $R^5=H$). This conversion is affected by the addition of two atoms of hydrogen, such addition being effected in the presence of a noble metal catalyst and in the presence of a suitable solvent. Optionally, the hydrogen addition may be carried out on an halogen acid addition salt of the dihydroisoquinoline (V). The resulting tetrahydroisoquinoline of Formula VI is treated with an alkyl or arylsulfonic acid chloride such as, for example, methanesulfonyl chloride, benzenesulfonyl chloride, or p-toluenesulfonyl chloride, or, with a suitable alkyl or aryl carboxylic acid derivative, for example, a carboxylic acid chloride, or, a carboxylic acid anhydride, in the presence of a suitable solvent such as, for example, benzene or toluene, and in the presence of an acid scavenging agent of the types mentioned above, to obtain the appropriately substituted tetrahydroisoquinoline (VII), in which $R^1$, $R^2$, $R^5$ and $R^6$ are as defined above. For example, when p-toluenesulfonylchloride is reacted with 1-phthalimidomethyl-6,7-dimethoxy - 1,2,3,4 - tetrahydroisoquinoline (VI, $R^1=R^2=OCH_3$, $R^5=H$), there is formed 1 - phthalimidomethyl - 2 - (p-toluenesulfonyl)-6,7,-dimethoxy-1,2,3,4-tetrahydroisoquinoline (VII, $$R^1=R^2=CCH_3$$

$R^5=H$, $R^6=$p-toluenesulfonyl). The compounds of Formula VII are dephthalylated by treatment with hydrazine in alcoholic solution at the reflux temperature of the mixture to obtain the corresponding compounds of Formula VIII in which $R^1$, $R^2$, $R^5$ and $R^6$ are as defined above. For example, 1-aminomethyl-2-(p-toluensulfonyl) - 6,7-dimethoxy-1,2,3,4-tetrahydroisoquinoline (VIII, $R^1=R^2=OCH_3$, $R^5=H$, $R^6=$p-toluenesulfonyl) is thus obtained from the corresponding phthalimido precursor of Formula VII in which $R^1$, $R^2$, $R^5$ and $R^6$ are as defined above. The compounds of Formula I are obtained from the corresponding intermediates of Formula VIII by reaction with an aldehyde of formula $R^3$—CHO in which $R^3$ is as defined above. Such reaction is preferably conducted in the presence of a mineral acid, such as, for example hydrochloric acid, and in a suitable solvent in which the reactants are soluble, such solvents including water and alcohols. The reaction, furthermore, is conducted at a temperature between 20° C. and 100° C. These operations give the acid addition salts of the compounds of Formula I, and, by treating these in a manner well known to those skilled in the art, for example by treating with an alkali hydroxide or carbonate, the compounds of Formula I in which $R^1$, $R^2$, $R^3$, $R^4$, $R^5$ and $R^6$ are as defined above, are obtained in the form of their free bases. For example, when 1-aminomethyl-2-(p-toluenesulfonyl) - 6,7 - dimethoxy-1,2,3,4-tetrahydroisoquinoline (VIII, $R^1=R^2=OCH_3$, $R^5=H$, $R^6=$p-toluenesulfonyl) is reaction with formaldehyde, 1-(p-toluenesulfonyl) - 5,6 - dimethoxy - 2,3,7,8,9,9a-hexahydro-1H-benzo[d,e][1,7]naphthyridine (I; $R^1=R^2=OCH_3$, $$R^3=R^4=R^5=H$$

$R^6=$p-toluenesulfonyl) is obtained.

The compounds of Formula I wherein $R^6$ represents a hydrogen atom may be prepared from those wherein $R^6$ is a p-toluenesulfonyl group and $R^4$ is a hydrogen atom, a lower alkyl or an aminoacyl group, by treating them with a reagent capable of cleaving the bond between the nitrogen atom and the tosyl group represented by $R^6$. Such reagents include, for example, acids, alkalis, lithium aluminum hydride, and metals dissolved in amines. Concomitantly, if $R^4$ is an aminoacyl group and the reagent is lithium aluminum hydride, the aminoacyl group will be reduced to the corresponding aminoalkyl group.

When it is desired to prepare the compounds of Formula I with $R^4$ and/or $R^6$ representing lower alkyl, lower acyl, or halo-substituted lower acyl groups, amino-substituted lower alkyl groups containing from four to nine carbon atoms, phenylalkyl or phenylacyl groups with six to eight carbon atoms optionally substituted in the phenyl ring, or alkoxycarbonylmethyl groups, this may be accomplished by reaction of the corresponding compounds in which $R^4$ and/or $R^6$ represent hydrogen, with an appropriate halogen compound of the formula $R^4$—X and $R^6$—X where $R^4$ and $R^6$ are as defined above and X represents chlorine or bromine. Alternatively, the compounds of Formula I where $R^4$ or $R^6$ is a methyl group may be prepared by treatment of the corresponding compounds of Formula I in which $R^4$ or $R^6$ is hydrogen, with formaldehyde and formic acid according to the well known Eschweiler-Clarke method.

Compounds, prepared as above, wherein $R^4$ or $R^6$ represent lower alkoxycarbonylmethyl groups, may be converted to those in which $R^4$ or $R^6$ represent carboxymethyl groups, by hydrolysis with an alkali metal carbonate or hydroxide.

Lower acyl, aminosubstituted lower acyl, and phenylacyl derivatives prepared as described above may be reduced with lithium aluminum hydride to the corresponding derivatives for Formula I wherein $R^4$ or $R^6$ represent lower alkyl, aminosubstituted lower alkyl and phenylalkyl groups.

The following formulae and examples, in which $R^1$, $R^2$, $R^3$, $R^4$, $R^5$ and $R^6$ have the significance defined above, will illustrate this invention.

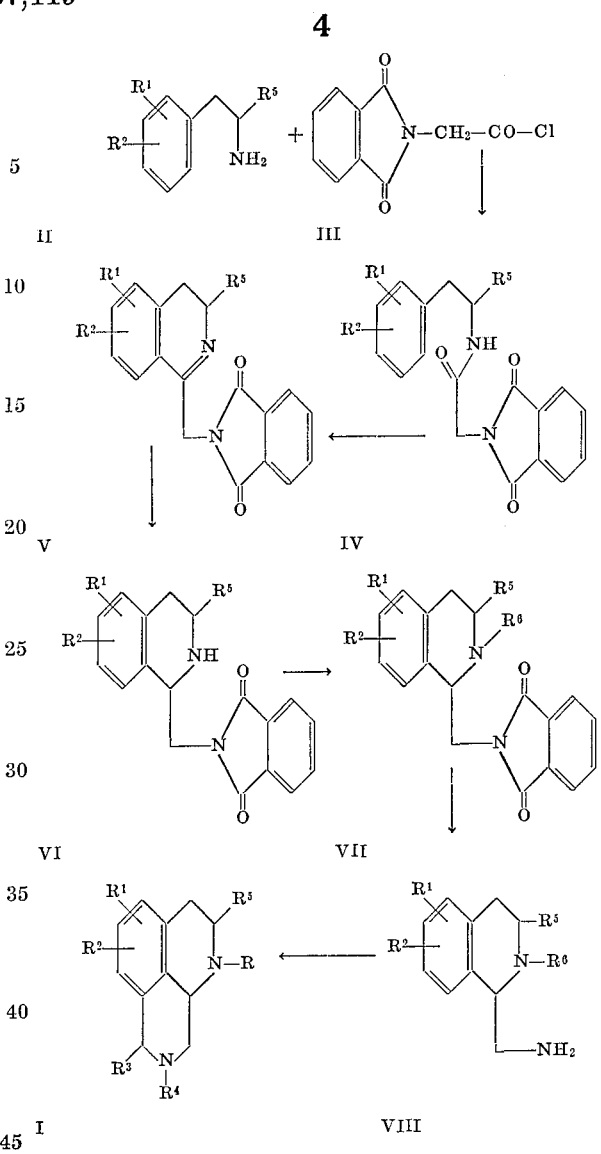

The composition of all the compounds described in the following examples is confirmed by elemental analysis.

EXAMPLE I

N-(phthalimidoacetyl)-2,3-dimethoxy-β-phenethylamine 2,3-dimethoxy-β-phenethylamine described by Haworth in J. Chem. Soc., 2282, 1927 (47.7 gm., 0.263 mole), is dissolved in 200 ml. of dichloromethane and added to a solution of sodium carbonate (13.25 gm., 0.125 mole) in 200 ml. of water. This mixture is cooled to 5° C. and with vigorous stirring there is added phthalylglycyl chloride (58.92 gm., 0.263 mole), dissolved in 200 ml. of dichloromethane, over a period of 45 minutes. The mixture is stirred at room temperature for 60 minutes and the insoluble title compound is filtered off, dissolved in warm chloroform, washed with 3 × 150 ml. of saturated sodium chloride solution, dried over sodium sulfate and evaporated to yield the title compound with M.P. 196–198° C. after recrystallization from ethanol, $$\nu_{max.}^{Mull.} \ 1655, \ 1725 \ \text{and} \ 1755 \ cm.^{-1}$$

By working in a similar manner to that described above, but using α-methyl-β-(3,4-dimethoxyphenyl)-ethylamine instead of 2,3-dimethoxy-β-phenethylamine, there is obtained N-(phthalimidoacetyl)-α-methyl-β-(3,4-dimethoxyphenyl)-ethylamine, M.P. 201–202° C.

EXAMPLE II

1-phthalimidomethyl-5,6-dimethoxy-3,4-dihydroisoquinoline

N - (phthalimidoacetyl) - 2,3-dimethoxy-β-phenethylamine (65.0 gm., 0.176 mole) is dissolved in 1000 ml. of benzene and phosphorous oxychloride (500 ml.) is added. The mixture is refluxed for 16 hours during which a steady evolution of hydrogen chloride is observed, cooled and diluted with 4000 ml. of petroleum ether. The supernatant is decanted and the residual red oily phosphate salt of the title compound is dissolved in chloroform (500 ml.) and shaken vigorously with 4× 200 ml. of 5% aqueous sodium carbonate, then washed with 2× 100 ml. of saturated NaCl solution. The chloroform solution is dried ($Na_2SO_4$), concentrated to 150 ml. and passed through a column of 650 gm. of alumina (Woelm-Activity II-Neutral). The column is washed with 6000 ml. of chloroform and the combined eluate evaporated in vacuo to yield a light yellow crystalline residue. It is crystallized from chloroform-ethanol to yield the title compound with M.P. 204–206° C., $\nu_{max.}^{CHCl_3}$ 1722, 1770, 1639 cm.$^{-1}$

EXAMPLE III

1-phthalimidomethyl-3-methyl-6,7-dimethoxy-3,4-dihydroisoquinoline

N - phthalimidoacetyl - α - methyl-β-(3,4-dimethoxyphenyl)-ethylamine (1.9 g., 0.005 mole) and phosphorus oxychloride (20 ml.) are refluxed for three hours. The brown solution is cooled and diluted with petroleum ether (200 ml., B.P. 30–60° C.) to precipitate an oil which is washed with petroleum ether. The combined petroleum ether washes are discarded. 50 ml. of water and 50 ml. of 1 N hydrochloric acid are added to the oil and heated to dissolution. On cooling, a yellow solid precipitates. It is collected, washed with acetone, and crystallized twice from ethanol to give the hydrochloride salt of the title compound, M.P. 219–220° C., $\nu_{max.}^{Nujol}$ 1723 and 1775 cm.$^{-1}$ 1.0 g. of the above hydrochloride salt is converted to the free base with ammonium hydroxide to give a solid which is crystallized twice from benzene to give the title compound with M.P. 216–217° C.

EXAMPLE IV

1-phthalimidomethyl - 5,6 - dimethoxy - 1,2,3,4 - tetrahydroisoquinoline 1-phthalimidomethyl - 5,6 - dimethoxy-3,4 - dihydroisoquinoline (29.78 gm., 0.085 mole) is dissolved in a mixture of 2 N hydrochloric acid (42.4 ml., 0.85 mole) and 200 ml. of glacial acetic acid. Platinum oxide catalyst (1.0 gm.) is added and the mixture is hydrogenated at room temperature and at an initial pressure of 50 p.s.i. After about 2 minutes, the calculated pressure drop (15.6 p.s.i.) is observed, indicating consumption of the theoretical amount of hydrogen. The mixture is filtered hot after treatment with charcoal and the filtrate is diluted with 1500 ml. of ether, cooled and filtered to yield a solid, M.P. 187–189° C. It is distributed between aqueous sodium carbonate solution and chloroform. The chloroform phase is dried ($Na_2SO_4$) and evaporated to yield a residue which upon crystallization from benzene yields the title product with M.P. 186–188° C.

In the same manner 1-phthalimidomethyl - 3 - methyl-6,7-dimethoxy-3,4-dihydroisoquinoline is reduced to yield 1-phthalimidomethyl-3 - methyl-6,7 - dimethoxy - 1,2,3,4-tetrahydroisoquinoline.

EXAMPLE V

1 - phthalimidomethyl - 2-(p-toluenesulfonyl) - 5,6 - dimethoxy-1,2,3,4-tetrahydroisoquinoline 1-phthalimidomethyl - 5,6 - dimethoxy - 1,2,3,4 - tetrahydroisoquinoline (10.0 gm., 0.0284 mole) is dissolved in 100 ml. of warm pyridine and added dropwise to a solution of p-toluenesulfonyl chloride (7.2 gm., 0.0378 mole) in 100 ml. of pyridine. The mixture is heated on the steam bath for 2 hours. The reaction mixture is poured into 1000 ml. of iced water and extracted with 4× 200 ml. of chloroform. The chloroform extract is washed with 3× 100 ml. of 10% hydrochloric acid, with 2× 100 ml. of sodium carbonate, with saturated sodium chloride solution, dried ($Na_2SO_4$) and evaporated to yield a residue which upon crystallization from acetonitrile yields the title compound with M.P. 181–182° C.

$\nu_{max.}^{CHCl_3}$ 1180, 1327, 1722, 1770 cm$^{-1}$

In the same manner, using the same starting material and reacting it with methanesufonyl chloride or acetic anhydride, respectively, there are obtained the corresponding 2-methanesulfonyl or 2-acetyl derivatives, respectively.

By working in a similar manner to that described above, but using 1-phthalimidomethyl - 6,7-dimethoxy - 1,2,3,4-tetrahydroisoquinoline (described by T. Yamazaki in J. Pharm. Soc. Japan, vol. 79, 1003 (1959)) instead of 1-phthalimidomethyl - 5,6 - dimethoxy - 1,2,3,4 - tetrahydroisoquinoline there is obtained 1-phthalimidomethyl-2-(p-toluenesulfonyl) - 6,7 - dimethoxy - 1,2,3,4 - tetrahydroisoquinoline, M.P. 146–147° C.

By working in the same manner as that described above, but by using 1-phthalimidomethyl - 6,7-dimetroxy - 1,2,3,4 - tetrahydroisoquinoline and methanesulfonylchloride as the reactants, there is obtained 1-phthalimidomethyl-2 - methanesulfonyl - 6,7 - dimethoxy - 1,2,3,4 - tetrahydroisoquinoline, M.P. 238–239.5° C.

By using 1-phthalimidomethyl - 6,7 - dimethoxy-1,2,3,4-tetrarydroisoquinoline and acetic anhydride as the reactants, there is obtained 1-phthalimidomethyl - 2-acetyl-6-7-dimethòxy-1,2,3,4-tetrahydroisoquinoline, M.P. 196° C.

In the same manner, 1-phthalimidomethyl - 3-methyl-6,7-dimethoxy-1,2,3,4 - tetrahydroisoquinoline is reacted with toluene sulfonyl chloride to give 1-phthalimidomethyl - 2-(p - toluenesulfonyl)-3 - methyl - 6,7-dimethoxy-1,2,3,4 - tetrahydroisoquinoline. The corresponding 2-methanesulfonyl and 2-acetyl derivatives are also obtained in the manner described above.

EXAMPLE VI

1 - aminomethyl - 2 - (p-toluenesulphonyl) - 4,6 - dimethoxy-1,2,3,4-tetrahydroisoquinoline 1-phthalimidomethyl - 2-(p-toluenesoulphonyl) - 5,6-dimethoxy - 1,2,3,4 - tetrahydroisoquinoline (7.4 gm., 0.0146 mole) is dissolved in 150 ml. of warm ethanol. To this solution is added 1 N hydrazine hydrate in ethanol (37.0 ml., 0.037 mole) and the mixture is refluxed on the steam bath for 2 hours. A homogenous solution is obtained after about 1 hour of reflux. After cooling, the mixture is filtered, the filtrate taken to dryness in vacuo and the residue combined with the original precipitate, 300 ml. of water and 20 ml. of 2 N hydrochloric acid are added. This mixture is heated on the steam bath for 15 minutes and after cooling, the granular precipitate of phthalazinedione is removed by filtration and washed with water. The filtrate is made alkaline with 5% sodium carbonate solution and extracted with 4× 150 ml. of benzene, dried ($Na_2SO_4$) and evaporated to yield a yellow oil. Crystallization from benzene-hexane gives crystals melting at 178–180° C. An aliquot is converted to the hydrochloride salt with ethereal hydrogen chloride. The amorphous salt is crystallized first from ethyl acetate, then from methanol-ether and is obtained as clusters of fine needles, M.P. 235–238° C.

In the same manner, by using the corresponding 2-methanesulfonyl or 2-acetyl derivatives as starting materials, there are obtained the 1-aminomethyl - 2-(methanesulfonyl- or acetyl)-5,6-dimethoxy - 1,2,3,4 - tetrahydroisoquinolines.

EXAMPLE VII

1 - aminomethyl - 2 - (p - toluenesulfonyl) - 6,7 - dimethoxy-1,2,3,4-tetrahydroisoquinoline 1-phthalimidomethyl - 2-(p - toluenesulfonyl) - 6,7-dimethoxy - 1,2,3,4 - tetrahydroisoquinoline (33.0 gm., 0.066 mole) is dissolved in 250 ml. of ethanol and 72.6 ml. of a 1 M solution of hydrazine hydrate in ethanol (0.0726 mole of hydrazine) and refluxed for one hour. At this time an additional 72.6 ml. of 1 M hydrazine hydrate in ethanol is added and the mixture is refluxed for one additional hour. After cooling, the solvents are removed in vacuo to yield a white solid material. It is slurried in water and 2 N hydrochloric acid is added with vigorous stirring until the mixture is acidic. The original solid is replaced by a granular precipitate of phthalazinedione and the aqueous acidic phase contains a solution of the hydrochloride salt of the title product. The acidic phase is separated from the solid by filtration, made alkaline with 6 N potassium hydroxide and extracted with chloroform. The chloroform phase is washed with water and then with saturated aqueuos sodium chloride solvent, dried and evaporated, to give the title product as an oil which solidifies upon trituration with ethyl acetate. Crystallization from benzene gives the title compound with M.P. 138–139° C. An aliquot is treated with ethereal hydrogen chloride. The hydrochloride salt of the title compound is crystallized from isopropanol-ether to M.P. 255–256° C.

EXAMPLE VIII 1-aminomethyl-2-(methanesulfonyl)-6,7-dimethoxy-1,2,3,4-tetrahydroisoquinoline 1 - phthalamidomethyl - 2 - (methanesulfonyl)-6,7-dimethoxy-1,2,3,4-tetrahydroisoquinoline (1.08 gm., 0.0025 mole) and a 10 percent molar excess of hydrazine are refluxed in 100 ml. of ethanol for four hours. The alcohol is removed in vacuo and the resulting solid is heated for 15 minutes at 50° C. with 2 N hydrochloric acid. The mixture is filtered and the filtrate made alkaline and extracted with chloroform to yield, after drying and evaporation, the title compound as a solid with M.P. 158–160° C. when crystallized from methanol-ether. It is converted by treatment with ethereal hydrogen chloride to its hydrochloride salt with M.P. 250° C. after crystallization from methanol.

In the same manner, by using the corresponding 2-acetyl derivative as the starting material, there is obtained 1 - aminomethyl - 2 - acetyl - 6,7 - dimethoxy - 1,2,3,4-tetrahydroisoquinoline.

Also, in the same manner, by using as starting material 1-phthalimidomethyl - 3 - methyl - 2 - (p-toluenesulfonyl- or -methanesulfonyl- or -acetyl)-6,7-dimethoxy-1,2,3,4-tetrahydroisoquinolines, there are obtained the corresponding 1-aminomethyl - 3 - methyl-2-(p-toluenesulfonyl- or -methanesulfonyl- or -acetyl)-6,7-dimethoxy-1,2,3,4-tetrahydroisoquinolines.

EXAMPLE IX 1-(p-toluenesulfonyl)-5,6-dimethoxy-2,3,7,8,9,9a-hexahydro-1H-benzo[d,e][1,7]naphthyridine 1 - aminomethyl - 2 - (p - toluenesulfonyl) - 6,7 - dimethoxy-1,2,3,4-tetrahydroisoquinoline (52.9 gm., 0.14 mole) is dissolved in 2 N hydrochloric acid (774 ml.), with warming on the steam bath. Aqueous formaldehyde (37%, 145.5 ml.) is added all at once and the mixture is heated on the steam bath for 2.0 hours. After 30 minutes of heating, a light yellow color appears and crystals begin to separate. On cooling, more crystals separate. By filtration and washing with water, then with acetone, there is obtained the hydrochloride salt of the title compound which is recrystallized from methanol-ether, to M.P. 238–239° C.

The title compound itself is obtained by treatment of the above hydrochloride salt with ammonia, followed by isolation and crystallization to M.P. 88–90° C.

Similarly, by using the 3-methyl derivative of the above starting material, there is obtained the corresponding 2-methyl derivative of the title compound.

Similarly, by reacting together acetaldehyde and 1-aminomethyl - 2 - (p - toluenesulfonyl) - 6,7 - dimethoxy - 1,2,3,4-tetrahydroisoquinoline, or its 3-methyl derivative, there is obtained 1-(p-toluenesulfonyl)-5,6-dimethoxy-7-methyl - 2,3,7,8,9,9a - hexahydro - 1H - benzo[d,e][1,7]naphthyridine or its 2-methyl derivative respectively.

In the same manner, but using the 2-methanesulfonyl or 2-acetyl analogs of the above starting material or of its 3-methyl derivative, and reacting them with formaldehyde, the 1-methanesulfonyl or 1-acetyl derivatives of 5,6-dimethoxy - 2,3,7,8,9,9a - hexahydro - 1H - benzo[d,e][1,7]naphthyridine or of its corresponding 2-methyl derivative are respectively obtained. When carrying out the same reaction with acetaldehyde instead of formaldehyde, the corresponding 7-methyl derivatives are obtained.

EXAMPLE X 1-(p-toluenesulfonyl)-6,7-dimethoxy-2,3,7,8,9,9a-hexahydro-1H-benzo[d,e][1,7]naphthyridine By working in a similar manner to that described in Example IX, but using formaldehyde and 1-aminomethyl-2-(p-toluenesulfonyl)-5,6-dimethoxy - 1,2,3,4 - tetrahydroisoquinoline as the reactants, there is obtained 1-(p-toluenesulfonyl) - 4,5 - dimethoxy-2,3,7,8,9,9a-hexahydro-1H-benzo[d,e][1,7]naphthyridine, M.P. 103–109° C. The hydrochloric acid addition salt has M.P. 224–226° C. Similarly, by using the 3-methyl derivative of the above starting material, there is obtained the 2-methyl derivative of the title compound.

Similarly, by using the above starting material or its 3-methyl derivative and reacting them with acetaldehyde instead of formaldehyde, the corresponding 7-methyl or 2,7-dimethyl derivatives of the title compound are also obtained respectively.

In the same manner, by using the 2-methanesulfonyl or 2-acetyl analogs of the above starting material, or of its 3-methyl derivative, there are obtained on reaction with formaldehyde or acetaldehyde, the 2-methanesulfonyl or 2-acetyl analogs of the title compound, or, of its 2-methyl derivatives, or of its 7-methyl, or, of its 2,7-dimethyl derivative, respectively.

EXAMPLE XI 5,6-dimethoxy-2,3,7,8,9,9a-hexahydro-1H-benzo[d,e][1,7]naphthyridine 1 - (p - toluenesulfonyl) - 5,6 - dimethoxy-2,3,7,8,9,9a-hexahydro - 1H - benzo[d,e][1,7]naphthyridine (5.2 gm., 0.0134 mole) is dissolved in a mixture of 30 ml. of tetrahydrofuran adn 200 ml. of distilled ammonia. Sodium is added in small pieces until a blue color persists for 15 minutes. The ammonia is allowed to evaporate and the residue is distributed between water and chloroform. The chloroform phase is dried and evaporated to yield the title compound with M.P. 135–136° C. after crystallization from isopropanol-ether. The dihydrochloride salt is prepared in the usual manner with ethereal hydrogen chloride and is obtained with M.P. 285° C. after crystallization from methanol.

In the same manner but using the 2-methyl or the 2,7-dimethyl derivatives of the above starting material, there are obtained the 2-methyl and the 2,7-dimethyl derivatives of the title compound.

Similarly, by using 1-(p-toluenesulfonyl)-4,5-dimethoxy-2,3,7,8,9,9a-hexahydro - 1H - benzo[d,e][1,7]naphthyridine, or its 2-methyl or its 2,7-dimethyl derivatives as starting materials, and proceeding as above, there is obtained 4,5-dimethoxy-2,3,7,8,9,9a-hexahydro - 1H - benzo[d,e][1,7]naphthyridine or its 2-methyl or its 2,7-dimethyl derivative, respectively.

EXAMPLE XII 1,8-diacetyl-5,6-dimethoxy-2,3,7,8,9,9a-hexahydro-1H-benzo[d,e][1,7]naphthyridine 5,6 - dimethoxy - 2,3,7,8,9,9a - hexahydro - 1H - benzo[d,e][1,7]naphthyridine (140 mg.) is dissolved in 2 ml. of pyridine and 0.5 ml. of acetic anhydride. The mixture is heated on the steam bath for two hours, poured into water and extracted with chloroform. The chloroform phase is washed with dilute hydrochloric acid, dilute sodium carbonate solution, then dried and evaporated to give the title compound as a solid with M.P. 147–148° C. after crystallization from ethyl acetate-hexane, $\nu_{max.}^{CHCl_3}$ 1645 cm.$^{-1}$

EXAMPLE XIII 1-(p-toluenesulfonyl)-5,6-dimethoxy-8-acetyl-2,3,7,8,9,9a-hexahydro-1H-benzo[d,e][1,7]naphthyridine 1-(p - toluenesulfonyl) - 5,6 - dimethoxy - 2,3,7,8,9,9a-hexahydro-1H-benzo[d,e][1,7]naphthyridine (3.0 gm.) is dissolved in 10 ml. of pyridine and 3.0 ml. of acetic anhydride are added. The mixture is heated on a steam bath for 60 minutes, poured into water and extracted with chloroform. The chloroform phase is washed with aqueous hydrochloric acid and sodium bicarbonate solution, dried, and evaporated to yield the title compound with M.P. 130–132° C. after crystallization from methanol-ether, $\nu_{max.}^{CHCl_3}$ 1635 cm.$^{-1}$, 1340 cm.$^{-1}$, 1158 cm.$^{-1}$

EXAMPLE XIV 1-(p-toluenesulfonyl)-5,6-dimethoxy-8 - (3 - chloropropionyl)-2,3,7,8,9,9a - hexahydro - 1H - benzo[d,e][1,7]naphthyridine 1-(p-toluenesulfonyl) - 5,6 - dimethoxy - 2,3,7,8,9,9a-hexahydro-1H-benzo[d,e][1,7]naphthyridine (12.31 gm.) is dissolved in benzene (150 ml.), 3-chloropropionyl chloride (5.0 ml.) is added and the mixture is refluxed for 2 hours. Evaporation of the solvent, trituration with hexane and crystallization from methanol gives the title compound with M.P. 125–127° C., $\nu_{max.}^{CHCl_3}$ 1640 cm.$^{-1}$, 1340 cm.$^{-1}$, 1158 cm.$^{-1}$ By working in a similar manner to that described above, but using chloroacetyl chloride instead of 3-chloropropionyl chloride, there is obtained 1-(p-toluenesulfonyl)-5,6-dimethoxy-8-chloroacetyl - 2,3,7,8,9,9a - hexahydro - 1H-benzo[d,e][1,7]naphthyridine, M.P. 128–130° C. (benzene);

$\nu_{max.}^{CHCl_3}$ 1650 cm.$^{-1}$

EXAMPLE XV 1-(p-toluenesulfonyl)-5,6-dimethoxy-8 - (3 - dimethylaminopropionyl)-2,3,7,8,9,9a - hexahydro 1H - benzo[d,e][1,7]naphthyridine 1-(p-toluenesulfonyl)-5,6-dimethoxy-8 - (3 - chloropropionyl)-2,3,7,8,9,9a-hexahydro-1H - benzo[d,e][1,7]naphthyridine (11.4 gm.) is heated with ethanol (70 ml.) and dimethylamine (15 ml.) in a pressure bottle for 16 hours at 90–95° C. Evaporation of the solvent leaves a residue. Crystallization from an ethyl acetate-hexane mixture gives the title compound with M.P. 129–131° C. It is characterized further as its hydrochloride salt, with M.P. 191–193° after crystallization from isopropanol-ether, prepared by treating the title compound with ethereal hydrogen chloride.

By working in a similar manner to that described above, 1-(p-toluenesulfonyl) - 5,6 - dimethoxy - 8 - chloroacetyl-2,3,7,8,9,9a-hexahydro-1H - benzo[d,e][1,7]naphthyridine and dimethylamine are reacted together to give 1-(p-toluenesulfonyl)-5,6 - dimethoxy - 8 - dimethylaminoacetyl-2,3,7,8,9,9a-hexahydro-1H-benzo[d,e][1,7]naphthyridine.

EXAMPLE XVI 8-(3-dimethylaminopropyl)-5,6-dimethoxy-2,3,7,8,9,9a-hexahydro-1H-benzo[d,e][1,7]naphthyridine 1-(p-toluenesulfonyl)-5,6-dimethoxy-8 - (3 - dimethylaminopropionyl)-2,3,7,8,9,9a-hexahydro-1H - benzo[d,e][1,7]naphthyridine (6.0 gm.) is dissolved in tetrahydrofuran (150 ml.) and refluxed for 15 hours with lithium aluminum hydride (6.0 gm.). Addition of water, removal of the inorganic material by filtration, drying and evaporation yields the title compound as a gum, $\nu_{max.}^{CHCl_3}$ 1480 cm.$^{-1}$, 1098 cm.$^{-1}$ It is converted to the tri-hydrochloride salt by treatment with ethereal hydrogen chloride, M.P. 238–240° C. and crystallization from ethanol-acetone.

By working in a manner similar to that described above, 1-(p-toluenesulfonyl)-5,6-dimethoxy - 8 - dimethylaminoacetyl-2,3,7,8,9,9a-hexahydro-1H - benzo[d,e][1,7]naphthyridine is reacted with lithium aluminum hydride to give 8-dimethylaminoethyl-5,6-dimethoxy - 2,3,7,8,9,9a - hexahydro-1H-benzo[d,e][1,7]naphthyridine as a gum with $\nu_{max.}^{CHCl_3}$ 1480, 1098 cm.$^{-1}$ The latter compound is further characterized as its trihydrochloride salt, M.P. 248–249° C., obtained by treatment with ethereal hydrogen chloride.

EXAMPLE XVII 1-(p-toluenesulfonyl)-5,6-dimethoxy-8-methyl-2,3,7,8,9,9a-hexahydro-1H-benzo[d,e][1,7]naphthyridine 1-(p-toluenesulfonyl)-5,6-dimethoxy-2,3,7,8,9,9a - hexahydro - 1H - benzo[d,e][1,7]naphthyridine (5.0 gm.) is mixed with formaldehyde (5 ml. of a 40% aqueous solution), formic acid (5.0 ml.) and water (5.0 ml.). The mixture is heated on the steam bath for 2 hours, diluted with water, made alkaline with ammonium hydroxide and extracted with chloroform to yield the title compound with M.P. 139–141° C. after crystallization from benzene-hexane. The hydrochloride salt has M.P. 208–209° C. and is obtained by treatment with ethereal hydrogen chloride.

EXAMPLE XVIII 5,6-dimethoxy-8-methyl-2,3,7,8,9,9a-hexahydro-1H-benzo[d,e][1,7]naphthyridine 1-(p-toluenesulfonyl)-5,6-dimethoxy-8-methyl - 2,3,7,8,9,9a-hexahydro - 1H - benzo[d,e][1,7]naphthyridine (1.0 gm.) is dissolved in a mixture of isopropanol (1.0 ml.), tetrahydrofuran (25 ml.) and ammonia (200 ml.), freshly distilled from lithium. Lithium wire (4.0 cm.) is added over a 10-minute period, until a blue color persists for 2 minutes. Ammonia is distilled off, benzene is added and the organic phase is washed with saturated sodium chloride solution. Evaporation yields an oil which on crystallization from benzene-hexene yields the title compound with M.P. 40–43° C. Treatment with ethereal hydrogen chloride yields the dihydrochloride salt with M.P. 243–241° C.

EXAMPLE XIX 1-(3,4-dimethoxyphenylacetyl)-5,6-dimethoxy-8-methyl-2,3,7,8,9,9a-hexahydro-1H-benzo[d,e][1,7]naphthyridine 5,6-dimethoxy-8-methyl - 2,3,7,8,9,9a - hexahydro-1H-benzo[d,e][1,7]naphthyridine (5.8 gm.) is dissolved in a mixture of ethylene dichloride (40 ml.) and 1 N sodium hydroxide (23.7 ml.). To this mixture is added at 20° C. a solution of 3,4-dimethoxyphenyl acetyl chloride (5.04 gm.) in 30 ml. of ethylene dichloride. The mixture is stirred at 20° C. for 2 hours. The organic phase is separated and washed with water until neutral. Drying and evaporation yields the title compound as a gum, $\nu_{max.}^{CHCl_3}$ 1640 cm.$^{-1}$ it is converted by treatment with ethereal hydrogen chloride to its hydrochloride salt, M.P. 134–136° C.

EXAMPLE XX

1-[β-(3,4 - dimethoxyphenylethyl)] - 5,6 - dimethoxy-8-methyl-2,3,7,8,9,9a - hexahydro - 1H - benzo[d,e][1,4]-naphthyridine 1-(3,4 - dimethoxyphenylacetyl) - 5,6 - dimethoxy - 8-methyl - 2,3,7,8,9,9a - hexahydro - 1H - benzo[d,e][1,7]naphthyridine (6.0 gm.) is dissolved in 150 ml. of tetrahydrofuran and refluxed for 15 hours with lithium aluminum hydride (6.0 gm.). Water is added, the inorganic by-products are removed by filtration, and the organic phase is dried and evaporated to yield the title compound as an oil, $\nu_{max.}^{CHCl_3}$ 1604 cm.$^{-1}$, 1490 cm.$^{-1}$ It is converted by treatment with ethereal hydrogen chloride to the dihydrochloride salt M.P. >220° C.

EXAMPLE XXI 1-acetyl-5,6-dimethoxy-8-methyl-2,3,7,8,9,9a-hexahydro-1H-benzo[d,e][1,7]naphthyridine 5,6 - dimethoxy - 8 - methyl - 2,3,7,8,9,9a - hexahydro-1H - benzo[d,e][1,7]naphthyridine (2.5 gm.) is mixed with acetic anhydride (5.0 ml.) and pyridine (10 ml.) and warmed on a steam bath. Dilution with water and extraction with benzene gives an oil. Crystallization from an ethyl acetate-hexane mixture yields the title compound with M.P. 116–117° C.

By working in a similar manner to that described above, acetic anhydride and 1-(p-toluenesulfonyl)-5,6-dimethoxy - 2,3,7,8,9,9a-hexahydro - 1H - benzo[d,e][1,7] naphthyridine yields 1 - (p - toluenesulfonyl) - 5,6 - dimethoxy - 8 - acetyl - 2,3,7,8,9,9a - hexahydro-1H-benzo [d,e][1,7]naphthyridine, M.P. 128–130° C.

Similarly, the reaction between mixed formic-acetic anhydride and 1 - (p - toluenesulfonyl) - 5,6 - dimethoxy-2,3,7,8,9,9a - hexahydro - 1H - benzo[d,e][1,7]naphthyridine yields 1-(p - toluenesulfonyl) - 5,6 - dimethoxy-8-formyl - 2,3,7,8,9,9a - hexahydro - 1H - benzo[d,e][1,7] naphthyridine, M.P. 184–186° C.

EXAMPLE XXII

Ethyl 1-(p-toluenesulfonyl)-5,6-dimethoxy-2,3,7,8,9,9a-hexahydro-1H-benzo[d,e][1,7]naphthyridine-8-acetate 1-(p - toluenesulfonyl) - 5,6 - dimethoxy - 2,3,7,8,9,9a-hexahydro - 1H-benzo[d,e][1,7]naphthyridine (8.0 gm.), ethyl bromoacetate (3.8 gm.), potassium carbonate (10.0 gm.) and benzene (150 ml.) are combined and refluxed with stirring for three and one half hours. The benzene phase is washed with aqueous potassium carbonate solution, dried and evaporated to yield the title compound with M.P. 133–134° C. after crystallization from ethyl acetate-hexane.

The above compound (500 mg.), on refluxing for three hours with sodium hydroxide (46 mg.) in an aqueous-ethanol solution, followed by filtration of this solution through an ion exchange column in the H$^+$ form, gives 1 - (p - toluenesulfonyl) - 5,6 - dimethoxy - 2,3,7,8,9,9a-hexahydro - 1H - benzo[d,e][1,7]naphthyridine-8-acetic acid, M.P. 138–140° C. after crystallization from water-ethanol.

I claim:
1. A compound selected from the group which consists of compounds of the formula

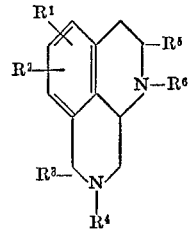

wherein R$^1$ and R$^2$ occupy positions 4, 5 or 6 and are selected from the group consisting of hydrogen, hydroxyl, lower alkoxy having from one to four carbon atoms and together, when adjacent to each other, the methylenedioxy group; R$^3$ is selected from the group consisting of hydrogen, lower alkyl having from one to four carbon atoms, phenyl and phenyl (lower alkyl) having from seven to ten carbon atoms; R$^5$ is selected from the group consisting of hydrogen and lower alkyl having from one to four carbon atoms; and R$^4$ and R$^6$ are selected from the group consisting of hydrogen, lower alkyl, dialkylaminoalkyl having from four to nine carbon atoms, formyl, acetyl, dimethylaminoacetyl, 3-dimethylaminopropionyl, chloroacetyl, 3 - chloropropionyl, phenylacetyl, methoxy-substituted phenylacetyl, methanesulfonyl, benzenesulfonyl, toluenesulfonyl, phenylalkyl having six to eight carbon atoms, methoxy-substituted phenylalkyl having six to eight carbon atoms in the phenylalkyl group, lower alkoxycarbonylmethyl and carboxymethyl; and salts therewith pharmacologically acceptable acids.

2. 1-(p - toluenesulfonyl) - 5,6 - dimethoxy - 2,3,7,8,9,9a - hexahydro - 1H - benzo[d,e][1,7]naphthyridine, as claimed in claim 1.

3. 1-(p - toluenesulfonyl) - 5,6 - dimethoxy - 7 - methyl - 2,3,7,8,9,9a - hexahydro - 1H - benzo[d,e][1,7]naphthyridine, as claimed in claim 1.

4. 1-(p - toluenesulfonyl) - 4,5 - dimethoxy - 2,3,7,8,9,9a - hexahydro - 1H - benzo[d,e][1,7]naphthyridine, as claimed in claim 1.

5. 5,6-dimethoxy - 2,3,7,8,9,9a - hexahydro - 1H-benzo[d,e][1,7]naphthyridine, as claimed in claim 1.

6. 1,8-diacetyl - 5,6 - dimethoxy - 2,3,7,8,9,9a - hexahydro - 1H - benzo[d,e][1,7]naphthyridine, as claimed in claim 1.

7. 1-(p-toluenesulfonyl) - 5,6 - dimethoxy - 8 - acetyl-2,3,7,8,9,9a-hexahydro - 1H - benzo[d,e][1,7]naphthyridine, as claimed in claim 1.

8. 1-(p - toluenesulfonyl) - 5,6 - dimethoxy - 8 - (3-chloropropionyl) - 2,3,7,8,9,9a - hexahydro - 1H - benzo [d,e][1,7]naphthyridine, as claimed in claim 1.

9. 1-(p - toluenesulfonyl) - 5,6 - dimethoxy-8-chloroacetyl - 2,3,7,8,9,9a - hexahydro - 1H - benzo[d,e][1,7] naphthyridine, as claimed in claim 1.

10. 1-(p - toluenesulfonyl) - 5,6 - dimethoxy - 8 - (3-dimethylaminopropionyl) - 2,3,7,8,9,9a - hexahydro-1H-benzo[d,e][1,7]naphthyridine, as claimed in claim 1.

11. 1-(p - toluenesulfonyl) - 5,6 - dimethoxy-8-dimethylaminoacetyl - 2,3,7,8,9,9a - hexahydro - 1H-benzo[d,e] [1,7]naphthyridine, as claimed in claim 1.

12. 8-(3 - dimethylaminopropyl) - 5,6 - dimethoxy-2,3,7,8,9,9a - hexahydro - 1H - benzo[d,e][1,7]naphthyridine, as claimed in claim 1.

13. 8-dimethylaminoethyl - 5,6 - dimethoxy - 2,3,7,8,9, 9a - hexahydro - 1H - benzo[d,e][1,7]naphthyridine, as claimed in claim 1.

14. 1-(p - toluenesulfonyl) - 5,6 - dimethoxy-8-methyl-2,3,7,8,9,9a - hexahydro - 1H - benzo[d,e][1,7]naphthyridine, as claimed in claim 1.

15. 5,6-dimethoxy - 8 - methyl - 2,3,7,8,9,9a - hexahydro - 1H - benzo[d,e][1,7]naphthyridine, as claimed in claim 1.

16. 1-(3,4 - dimethoxyphenylacetyl) - 5,6 - dimethoxy-8 - methyl - 2,3,7,8,9,9a - hexahydro - 1H - benzo[d,e][1,7]naphthyridine, as claimed in claim 1.

17. 1-[β - (3,4 - dimethoxyphenylethyl)] - 5,6-dimethoxy - 8 - methyl - 2,3,7,8,9,9a - hexahydro - 1H - benzo[d,e][1,7]naphthyridine, as claimed in claim 1.

18. 1-acetyl - 5,6 - dimethoxy - 8 - methyl - 2,3,7,8,9 9a- hexahydro - 1H - benzo[d,e][1,7]naphthyridine, as claimed in claim 1.

19. 1-(p - toluenesulfonyl) - 5,6 - dimethoxy - 8-acetyl-2,3,7,8,9,9a - hexahydro - 1H - benzo[d,e][1,7]naphthyridine, as claimed in claim 1.

20. 1-(p - toluenesulfonyl) - 5,6 - dimethoxy-8-formyl-2,3,7,8,9,9a - hexahydro - 1H-benzo[d,e][1.7]naphthyridine, as claimed in claim 1.

21. Ethyl 1-(p - toluenesulfonyl) - 5,6 - dimethoxy-2,3, 7,8,9,9a - hexahydro - 1H-benzo[d,e][1,7]naphthyridine-8-acetate, as claimed in claim 1.

22. 1-(p - toluenesulfonyl) - 5,6 - dimethoxy - 2,3,7,8, 9,9a - hexahydro - 1H - benzo[d,e][1,7]naphthyridine-8-acetic acid, as claimed in claim 1.

References Cited
UNITED STATES PATENTS

| | | | |
|---|---|---|---|
| 3,015,662 | 1/1962 | Rorig | 260—287 |
| 3,300,499 | 1/1967 | Lesher et al. | 260—287 |
| 3,393,195 | 7/1968 | Thesing | 260—288X |

DONALD G. DAUS, Primary Examiner

U.S. Cl. X.R.

260—286, 288, 326.5, 570; 424—258